Patented July 5, 1938

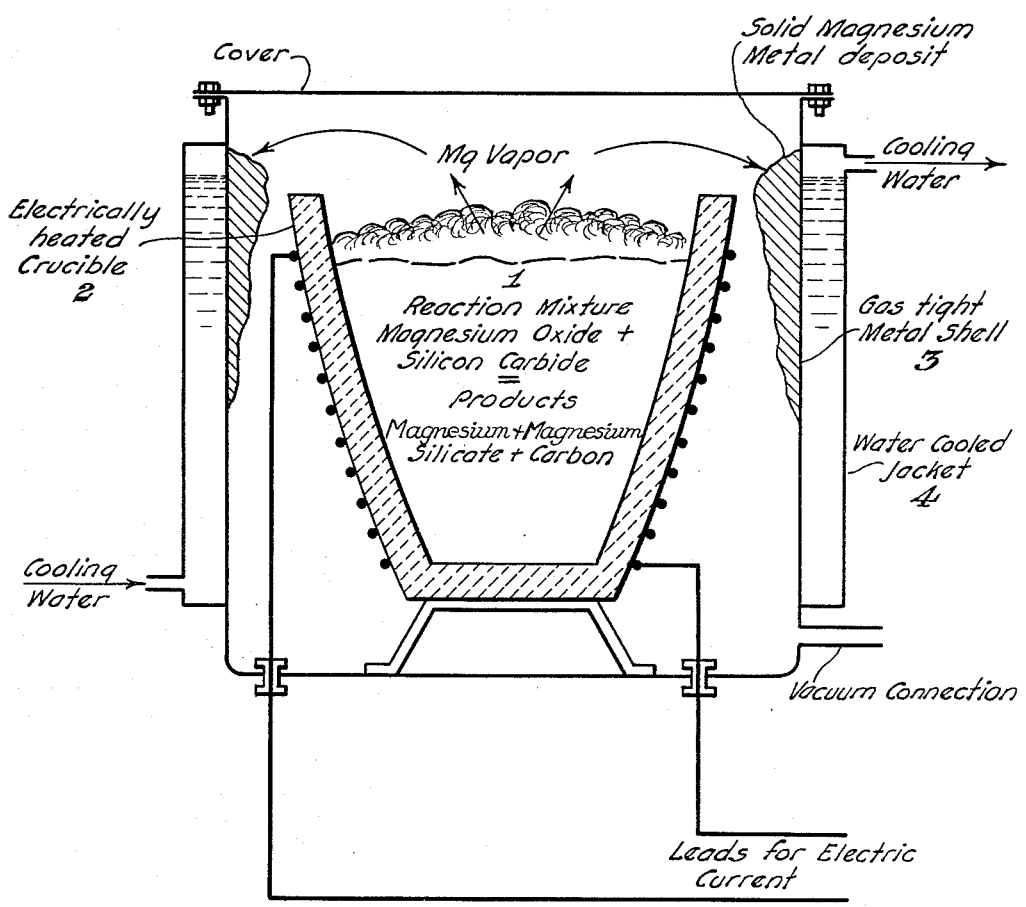

2,122,435

UNITED STATES PATENT OFFICE 2,122,435

METHOD OF PRODUCING MAGNESIUM

Charles E. Nelson and John S. Peake, Midland, Mich., assignors to The Dow Chemical Company, Midland, Mich., a corporation of Michigan Application October 1, 1936, Serial No. 103,604

8 Claims. (Cl. 75—67)

The invention relates to methods of producing magnesium from magnesium-containing ores. It more particularly concerns an improved method wherein a magnesium oxide-containing material is subjected to thermal reduction, liberating magnesium as a vapor which is subsequently condensed upon a suitably cooled surface.

We have discovered that by heating magnesium oxide with silicon carbide to a suitable temperature metallic magnesium is liberated as a vapor together with carbon monoxide, magnesium silicate also being formed, apparently according to the following equation:—

(I)  $9MgO + 2SiC = 6Mg + 2CO + Mg_3Si_2O_7$

On cooling the magnesium vapor and carbon monoxide some reaction may occur between these gases forming magnesium oxide and carbon according to the following reversible reaction:—

$6Mg + 2CO \rightleftarrows 4Mg + 2MgO + 2C$

The proportion of magnesium vapor liberated during the heating operation that is recoverable as metallic magnesium depends upon the temperature of the reaction mixture and the rate of condensation. It varies from a minimum of 4/9 to a maximum of 6/9 of the magnesium present in the original oxide material. Thus, even though no especial precautions are taken to prevent the recombination of the carbon monoxide with the magnesium vapor, metallic magnesium is obtained in amount equal to approximately 4/9 or more of the magnesium content of the raw material.

Instead of magnesium oxide, materials containing magnesium oxide, such as calcined dolomite (MgOCaO), may be used as the raw material, or mixtures of MgO and CaO, and the reaction in such case appears to go according to the following equation:—

(II)  $2CaOMgO + SiC = 2Mg + \text{calcium silicates} + CO$

Thus when the magnesium oxide material contains sufficient calcium oxide, as when calcined dolomite is used as the raw material, the silicon of the silicon carbide forms calcium silicates containing variable ratios of CaO to $SiO_2$, instead of $Mg_3Si_2O_7$, as in the case when magnesium oxide alone is heated with silicon carbide. Furthermore, a higher percentage of the magnesium in the raw material is obtained as vapor when magnesium oxide is heated in the presence of calcium oxide. The reaction occurs at temperatures above about 1400° C., proceeding smoothly and rapidly at a temperature between about 1500° and 1800° C.

The drawing illustrates diagrammatically the apparatus in which the method is practiced.

In carrying out the invention the materials are preferably finely ground and then intimately mixed in approximately the proportions as indicated by the equations, according to whether or not calcium oxide is present with the magnesium oxide to be reduced, although it is desirable to employ an excess of magnesium oxide over the silicon carbide, such excess being, for example, from 10 to 40 per cent. The mixture is placed in a suitable vessel and heated to reaction temperature preferably under sub-atmospheric pressure or in an inert gas, such as helium or hydrogen. The metal is liberated from the reaction mixture as a vapor and may be condensed upon a suitable cooled surface, e. g. iron or steel. For example, referring to the drawing, the mixture 1 of silicon carbide and magnesium oxide-containing material may be placed in an electrically heated crucible 2 of a material, preferably non-reactive to magnesium, such as graphite, which is surrounded by a gas-tight metal shell 3, the shell being cooled by the water jacket 4 so as to act as a condensing surface for the vaporized magnesium. The condensed product is obtained usually in crystalline form, especially when the magnesium vapor is condensed rapidly as it issues from the heated reaction mixture. The following examples are illustrative of the invention:—

*Example 1*

6.4 pounds of magnesium oxide and 1.6 pounds of silicon carbide, both powdered, were mixed together and placed in an open graphite vessel surrounded by a water-cooled vacuum-tight steel jacket in close proximity to the vessel. The interior of the jacket was connected to a vacuum pump which removed the relatively non-condensable gases evolved during the heating operation. The temperature of the mixture was raised to about 1560° C. by passing an electric current through the graphite vessel and held at this temperature for 40 minutes, bringing about reaction and liberating magnesium vapor. During the heating operation the pressure in the vessel was maintained below 10 millimeters of mercury, absolute, and the magnesium vapor which was evolved from the mixture condensed on the inner surface of the jacket. The yield was 1.44 pounds of magnesium, which was approximately 56 per cent of the theoretical yield as shown by Equation I. The residue in the vessel was largely magnesium silicate, undecomposed magnesium oxide, and carbon.

Example 2

A similar experiment was carried out, using 7.0 pounds of calcined dolomite containing 38.9% of MgO and 1.0 pound of silicon carbide. These materials were powdered, mixed together and then heated to approximately 1626° C. The yield was 1.05 pounds of magnesium or about 64 per cent of the theoretical yield as shown by Equation II. The residue in the vessel was largely a mixture of calcium silicates.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of making metallic magnesium, the step which consists in heating together silicon carbide and a magnesium oxide-containing material to a temperature capable of liberating magnesium.

2. In a method of making metallic magnesium, the step which consists in heating a mixture comprising silicon carbide and magnesium oxide to a temperature above about 1400° C.

3. In a method of making metallic magnesium, the step which consists in heating a mixture comprising silicon carbide and calcined dolomite to a temperature capable of liberating magnesium.

4. In a method of making metallic magnesium, the step which consists in heating magnesium oxide in the presence of silicon carbide and calcium oxide to a temperature capable of liberating magnesium.

5. In a method of making metallic magnesium, the steps which consist in heating a mixture comprising silicon carbide and magnesium oxide under sub-atmospheric pressure to a temperature capable of liberating magnesium vapor and condensing the vapor.

6. In a method of making metallic magnesium, the steps which consist in heating silicon carbide and magnesium oxide in the presence of calcium oxide under sub-atmospheric pressure to a temperature capable of liberating magnesium vapor.

7. In a method of making metallic magnesium, the steps which consist in heating a mixture comprising silicon carbide, magnesium oxide, and calcium oxide under sub-atmospheric pressure to a temperature capable of liberating magnesium vapor, and condensing magnesium vapor.

8. In a method of making metallic magnesium, the steps which consist in heating together silicon carbide and a magnesium oxide-containing material to a temperature capable of liberating magnesium vapor, and condensing magnesium vapor.

CHARLES E. NELSON.
JOHN S. PEAKE.